July 8, 1947.  G. E. LEE  2,423,562

FILM CARTRIDGE FOR MOVING PICTURE CAMERAS

Filed June 22, 1944

INVENTOR.
George E. Lee
BY
ATTORNEY.

Patented July 8, 1947

2,423,562

UNITED STATES PATENT OFFICE 2,423,562

FILM CARTRIDGE FOR MOVING PICTURE CAMERAS

George E. Lee, Kansas City, Mo.

Application June 22, 1944, Serial No. 541,554

6 Claims. (Cl. 88—17)

This invention relates to moving picture cameras of the type employing cartridges of removable receptacles for the strip of perforated film, and has for its primary aim to provide means in such a cartridge for preventing the accidental movement past the exposure opening of a length of said film which is not propelled by the mechanical advancing mechanism of the camera.

This invention has for one of its important aims the provision of a moving picture camera film cartridge having as a part thereof, a film guard disposed and formed to insure winding onto the power driven spool only such film strip as has been moved past the exposure opening by the step-by-step advancing means of the camera.

Other objects of the invention include the provision of a moving picture camera cartridge for the marginally perforated film strip, which cartridge has a guard for the film disposed adjacent to the power driven spool upon which the film is collected after being advanced by step-by-step mechanism, and guides to direct the film toward the guard as it moves past the exposure opening toward the collecting spool.

Further and more specific objects of the invention will appear during the course of the following specification, referring to the accompanying drawing, wherein.

Figure 1:
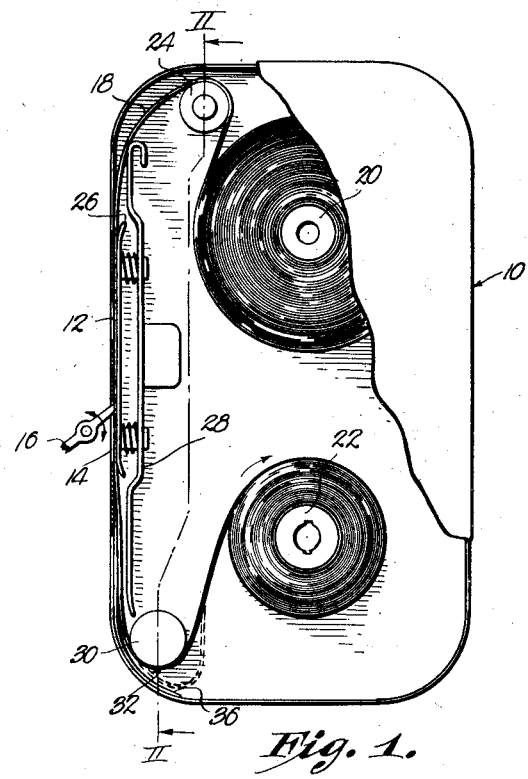
Fig. 1 is a side elevational view of a film cartridge for moving picture cameras having parts thereof broken away to reveal the elements embodying this invention.
Figure 2:
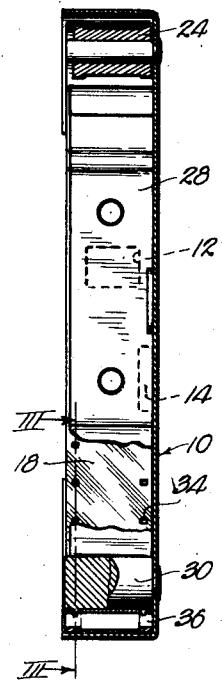
Fig. 2 is a longitudinal cross sectional view through the cartridge taken on line II—II of Fig. 1, and looking in the direction of the arrow.
Figure 3:
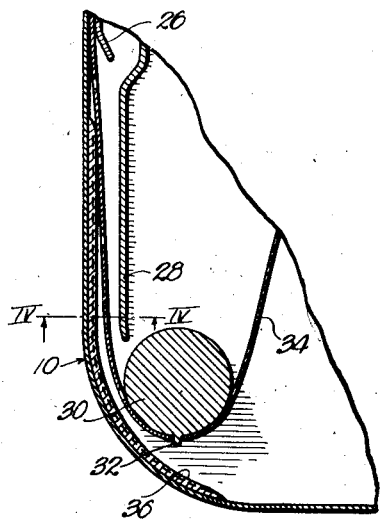
Fig. 3 is an enlarged fragmentary detailed sectional view through the film guard and guide, taken on line III—III of Fig. 2.
Figure 4:
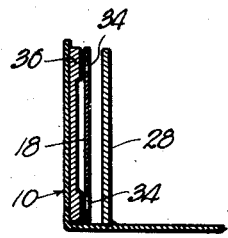
Fig. 4 is an enlarged fragmentary detailed sectional view taken on line IV—IV of Fig. 3.

One of the most troublesome problems that has arisen in the operation of some moving picture cameras, is the avoidance of accidental movement of portions of the film strip past the exposure opening of the cartridge. In moving picture cameras where a constantly rotating spool is employed for collecting the exposed film strip, the step-by-step advancing mechanism is sometimes "overrun," due to inaccurate timing relation between the power driven spool and the advancing mechanism, and further, because of the progressively increasing diameter of the exposed film as it collects upon the spool. It has been found desirable, therefore, to incorporate in film cartridges for moving picture cameras, guard elements for arresting the movement of the film strip onto the power driven spool, unless the step-by-step advancing mechanism has first carried the film to be wound, past the exposure opening. This type of equipment as well as means for directing the film toward the guard, is shown in the illustrated embodiment of the preferred form of the invention.

In the drawing, the numeral 10 indicates generally, the film cartridge case having formed in one edge thereof, the exposure opening 12 and the slot 14 through which passes the finger 16 during the normal operation of the mechanism.

Finger 16 is actuated in a manner now well-known in the art, to advance the film strip 18 step-by-step past exposure opening 12, where an exposure is made on a single "frame" of the film strip 18. The unexposed portion of film strip 18 is on idler spool 20, while the exposed portion of film strip 18 is on power driven spool 22.

The portion of film strip 18 extending between spools 20 and 22 is held in operative position by guide pin or idler 24, and a pressure foot 26. This pressure foot is spring-loaded and yieldably mounted in place by bracket 28.

It has heretofore been customary to supply an additional idler guide or roller adjacent to power driven spool 22, but without regard to the amount of film that is drawn therearound by this spool 22. In carrying out this invention, guard 30 is in the nature of a pin mounted directly to case 10 and provided with a spur 32 for perforations 34 formed in the marginal edges of film strip 18.

In practice there should be a pair of spurs 32 lying in register with the perforated marginal edges of film strip 18. Guard 30 should be a stationary, rounded pin or similar member, and its position with respect to power driven spool 22 should be as illustrated in Fig. 1. In other words, that portion of film strip 18 approaching spool 22, is substantially U-shaped and the guard member 30 is at the bight of this U-shaped portion of the film. Spurs 32 should be directed downwardly so that the step-by-step advancing mechanism may move the film from these spurs to a position shown in dotted lines of Fig 1.

Spool 22 moves constantly, and therefore, the "slack," created by the forward movement of the film, will be at once absorbed by the rotation of spool 22. If spool 22 should rotate at a speed greater than that required to absorb the slack created by the step-by-step film moving mechanism, then film 18 will be engaged and held against movement past the exposure opening 12 until finger 16 has forced the bight of the film, formed around pin 30, far enough therefrom to disengage perforations 34 and spurs 32.

Guide elements 36 mounted directly upon the inner surface of case 10 and in a position with respect to pin 30, as illustrated in the drawing, insure that the film strip 18 will lie in a position to be drawn against guard pin 30 by spool 22, if maladjustment occurs between this said spool 22 and finger 16.

This guide 36 is in the form of a pair of parallel tracks, one of which lies along the perforated marginal edge of a portion of the film strip 18.

An additional function of this guide 36 is to maintain the emulsion on film strip 18 out of frictional engagement with the inner surface of the wall of case 10. Since the position of the film is normally somewhere between its illustrated position as shown in full and dotted lines of Fig. 1, this part of the film is "slack" and usually lies close to the wall of case 10. The guide 36, therefore, performs a two-fold function.

In converting conventional film cartridges to include the parts above described, it is but necessary to add guard pin 30 and track 36—all to the end that the exposed film will not have a number of unexposed frames therein due to accidental drawing of short lengths of the film strip past exposure opening 12.

It is obvious that the elements embodying the invention and the manner of combining the same with conventional parts of the film cartridge, might be altered without departing from the spirit of the invention and scope of the appended claims.

Having thus described the invention, what is claimed as new and desired to be secured by Letters Patent is:

1. In a film cartridge for moving picture cameras wherein the film strip is advanced step-by-step past an exposure opening in the cartridge, said cartridge having a power driven spool for marginally perforated film; the combination of a guard member disposed to engage the film and hold the same against movement past the exposure opening by the power driven spool; a guide for directing the film toward the said guard; and a spur on the guard member for entering one of the perforations of the film strip when the power driven spool draws the film strip taut between the guard member and the said spool.

2. In a film cartridge for moving picture cameras wherein the film strip is advanced step-by-step past an exposure opening in the cartridge, said cartridge having a power driven spool for marginally perforated film; the combination of a stationary guard spur disposed to enter one of the perforations of the film strip when the power driven spool draws the film taut between the guard spur and the power driven spool.

3. In a film cartridge for moving picture cameras wherein the film strip is advanced step-by-step past an exposure opening in the cartridge, said cartridge having a power driven spool for marginally perforated film; the combination of a stationary guard spur disposed to enter one of the perforations of the film strip when the power driven spool draws the film taut between the guard spur and the power driven spool, said guard spur being between the power driven spool and the step-by-step advancing means of the camera.

4. In a film cartridge for moving picture cameras wherein the film strip is advanced step-by-step past an exposure opening in the cartridge, said cartridge having a power driven spool for marginally perforated film; the combination of a stationary guard spur disposed to enter one of the perforations of the film strip when the power driven spool draws the film taut between the guard spur and the power driven spool, said guard spur being between the power driven spool and the step-by-step advancing means of the camera, said guard spur having a track associated therewith for directing the film strip toward the guard spur.

5. In a film cartridge for moving picture cameras wherein the film strip is advanced step-by-step past an exposure opening in the cartridge, said cartridge having a power driven spool for marginally perforated film; the combination of a stationary guard spur disposed to enter one of the perforations of the film strip when the power driven spool draws the film taut between the guard spur and the power driven spool, said guard spur being between the power driven spool and the step-by-step advancing means of the camera, the said guard being positioned to cause the step-by-step advancing means of the camera to force the film strip out of engagement with the guard at the end of each step whereby the power driven spool draws thereonto only the exposed film strip.

6. In a film cartridge for moving picture cameras, wherein the film strip is marginally perforated, is divided into frames and is advanced step-by-step past an exposure opening to successively position the frames in register with the said opening, said cartridge having a guide bracket and a power driven spool disposed with respect to each other to cause the film to assume a U-shaped loop between the said bracket and the spool, the U-shaped loop being periodically shifted from one position to another as the film is advanced step-by-step; the combination of a stationary guard having an arcuate face adjacent to the bight of the film loop for engagement therewith when the loop is in one position; and a spur on the guard radially disposed with respect to the bight of the loop for engaging one of the perforations of the film to positively arrest the movement of the film when the loop is in said one position with one of the frames in register with the said exposure opening, the movement of the loop from said one position toward the other position being in a direction to withdraw the film from engagement with said spur.

GEORGE E. LEE.

REFERENCES CITED

The following references are of record in the file of this patent:

UNITED STATES PATENTS

| Number | Name | Date |
|---|---|---|
| 2,106,374 | Goldhammer et al. | Jan. 25, 1938 |
| 2,231,665 | Fairbanks | Feb. 11, 1941 |
| 1,839,064 | Thornton | Dec. 29, 1931 |
| 1,839,132 | Thornton | Dec. 29, 1931 |
| 1,942,890 | Wittel | Jan. 9, 1934 |